July 4, 1967    V. M. ROACH    3,329,272
SELF-HOUSED LARGE CAPACITY WATER FILTRATION PLANT
Filed Oct. 1, 1964    2 Sheets-Sheet 1

INVENTOR:
VINCENT M. ROACH
BY
Dawson, Tilton, Fallon, Lungmus & Alexander
ATT'YS July 4, 1967
V. M. ROACH
3,329,272
SELF-HOUSED LARGE CAPACITY WATER FILTRATION PLANT
Filed Oct. 1, 1964
2 Sheets-Sheet 2
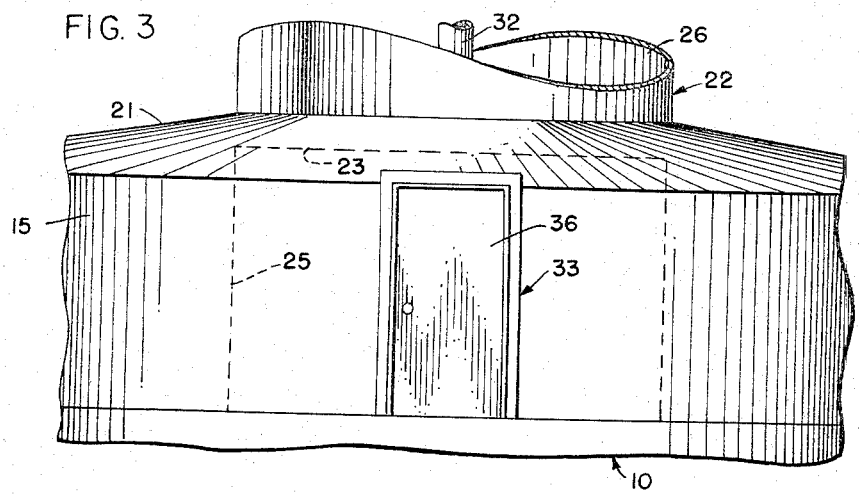
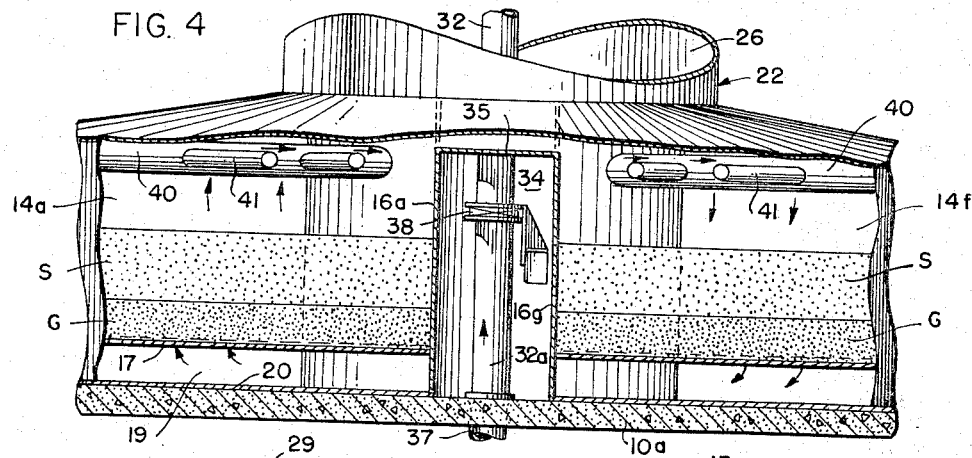
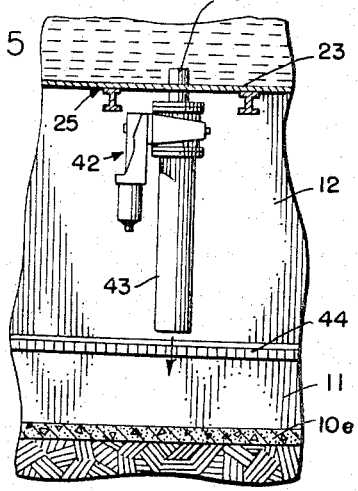
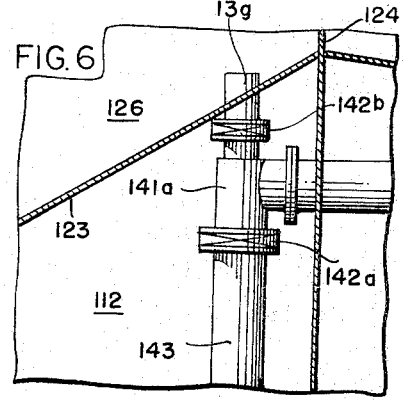
INVENTOR:
VINCENT M. ROACH
BY
Dawson, Tilton, Fallon, Lungmus & Alexander
ATT'YS

United States Patent Office 3,329,272
Patented July 4, 1967

3,329,272
SELF-HOUSED LARGE CAPACITY WATER FILTRATION PLANT
Vincent M. Roach, Ames, Iowa, assignor to General Filter Company, Ames, Iowa, a corporation of Iowa
Filed Oct. 1, 1964, Ser. No. 400,703
13 Claims. (Cl. 210—253)

ABSTRACT OF THE DISCLOSURE

A self-housed large capacity water filtration plant having a central operating gallery, a battery of filter cells surrounding said gallery and a water storage tank overlying the gallery. The flow control valves are housed in the gallery and a walkway leads from the gallery to the outside of the filtration plant.

---

This invention relates to a self-housed large capacity water filtration plant. The filtration plant of this invention is adapted for use by municipalities and industries in treating water for municipal and industrial uses at rates of at least 1,000 gallon per minute. The plant of this invention has particular utility at rated capacities of 1,000,000 to 6,000,000 gallons per day.

Prior to the development of the design upon which the present invention is based, it was necessary to provide a separate building or buildings to enclose or house the water filtration plant or at least the control valves, such as the raw water inlet control valve, the filter cell inlet control valves, the backwash control valves, etc. In most sections of the United States, (except for the far south) where freezing weather is encountered during the winter season, the control valves and associated piping must be protected to prevent ice from forming in the lines and valves, and thereby making it difficult or impossible to vary or change the valve positions or settings as required. Since the cost of erecting a separate building substantially increases the cost of installing a water filtration plant, it has long been desired to eliminate the necessity for such a building.

It is therefore, a general object of this invention to provide a self-housed water filtration plant which substantially overcomes the problems and difficulties just described. A more specific object is to provide a filtration plant which is particularly suitable for use in large rated capacities and which does not require a separate building to house the control valves and associated piping, such as the well water control valve, the valves in the pipes from the detention tank to the filter cells, the valves on the backwash pipe connections, etc. Another related object is to provide a self-housed and self-contained water filtration plant which substantially reduces the amount of piping required to transfer water from the detention tank to the filter cells during normal filtration, or from the filter cells to the sump during backwashing, while at the same time making such piping and the control valves associated therewith readily accessible to the operator. Further objects and advantages will be indicated in the following detailed specification.

This invention is shown in an illustrative embodiment in the accompanying drawing, wherein—

FIGURE 3 is a fragmentary side elevational view looking in the direction indicated by the line 3—3 of FIG. 1;

FIGURE 4 is a fragmentary elevational sectional view taken on line 4—4 of FIG. 1;

FIGURE 5 is a fragmentary elevational sectional view taken on line 5—5 of FIG. 1; and FIGURE 6 is a fragmentary side elevational view showing a modification, the view being partly in section.

Figure 1:
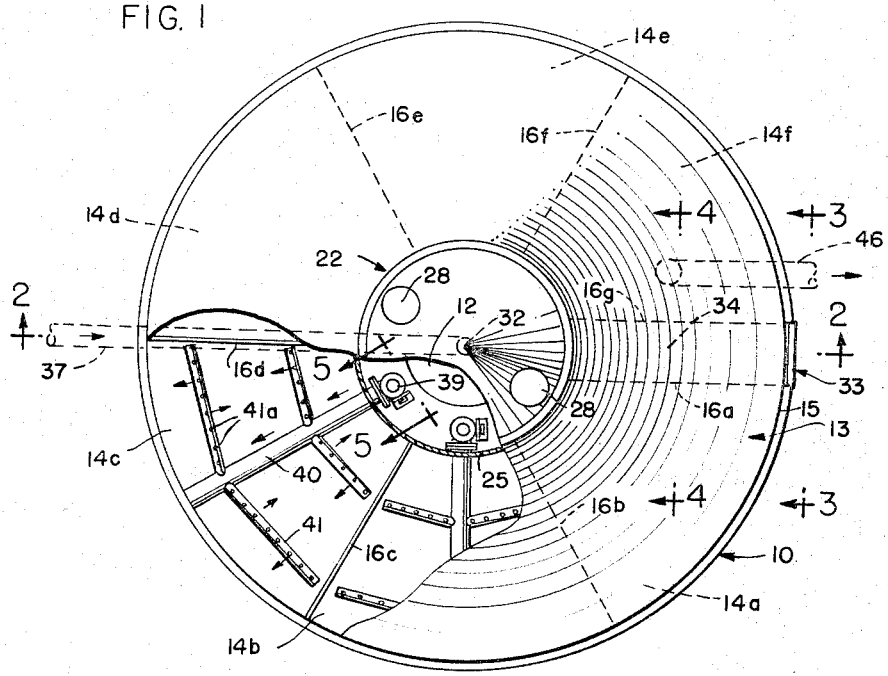
FIGURE 1 is a top plan view of a water filtration plant incorporating the features of the present invention, part of the lower tank unit being broken away to show the filter cells and other internal structure.
Figure 2:
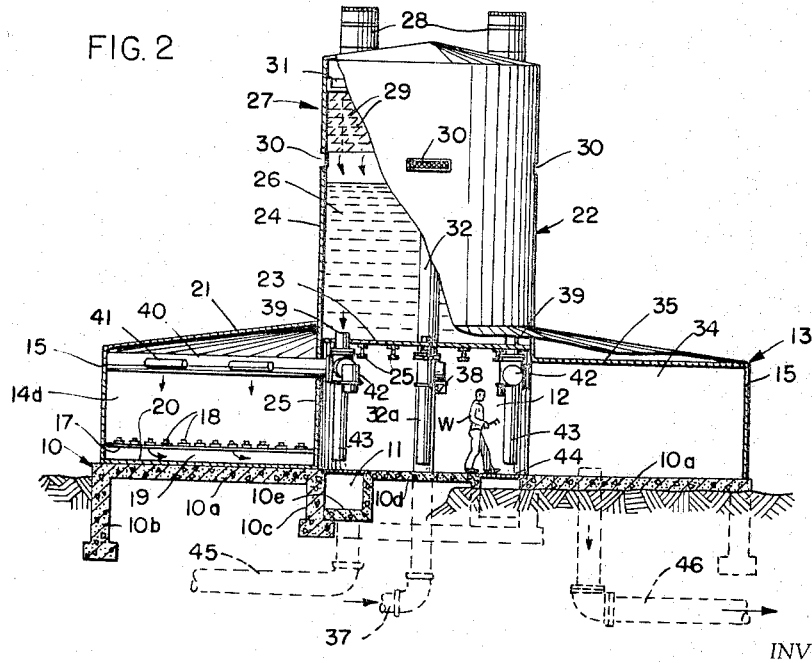
FIGURE 2 is a side elevational view of the filtration plant of FIG. 1, part of the structure being shown in the section indicated by the line 2—2 in FIG. 1.

Looking first primarily at FIGURES 1 and 2, it can be seen that the filtration plant includes a horizontally-extending support base 10 (FIG. 2). This base may be conveniently formed of concrete, as in the illustration given. For the purpose of the present invention, the base 10 may consist of a relatively thick outer annular portion 10a supported on each side by footings, 10b and 10c. The center portion of the base 10d may be formed of a thinner layer of concrete, and may conveniently provide a downwardly offset portion 10e which cooperates with the footing 10c to provide an annular sump 11.

In accordance with the present invention, there is provided an operating gallery 12 which is disposed centrally with respect to the base 10 and extends thereabove, as shown more clearly in FIG. 2. Suitable means is provided to enclose the operating gallery 12, as will be subsequently described.

A filtration unit designated generally by the number 13 is disposed in perimetric configuration around the sides of the operating gallery 12. The filtration unit 13 comprises a battery of filter cells which are arranged side by side above annular base portion 10a. In the illustration given, six cells are provided, being designated respectively by the numbers 14a, 14b, 14c, 14d, 14e and 14f. In the illustration given, the outer wall 15 of the filter unit 13 is cylindrical. While this construction is preferred, wall 15 may be formed in other configurations such as in a square or rectangular shape. Outer wall 15, as shown, preferably serves as the outer wall of each of the filter cells.

The side walls of the filter cells are provided by vertically-extending partition walls. In the illustration given, the partition walls extend substantially radially inward, being designated respectively by the numbers 16a, 16b, 16c, 16d, 16f, and 16g (FIG. 1). The resulting filter cells are therefore substantially segments of a circle.

Near the bottom of the filter cells there is provided an underdrain plate 17 (FIGS. 2 and 4). In accordance with well known practice, the underdrain plate 17 is equipped with a multiplicity of baffle outlets 18, is indicated in FIGURE 2, which are designed to retain the filter media within the cells while permitting the filtered water to pass downwardly to the underdrain collection space 19 during normal filtration. Bracing or supports will also be provided for the plate 17, as is well known in the art.

Any of the usual filter media can be employed in the cells, such as fine sand or a layer of sand supported upon a layer of gravel. In FIGURE 4, there is indicated a layer of sand S, supported on a layer of gravel G. It will be understood that such filter media are employed in each of the cells 14a to 14f.

In the illustration given, the bottom of the underdrain 19 is provided by a base plate 20 of annular configuration. There is also provided an annular cover 21 which closes the tops of the filter cells. To minimize the build-up of snow or ice and provide for drainage of rain or melting snow, cover 21 may be pitched downwardly and outwardly, as shown more clearly in FIGURE 2. It will be understood that the individual filter cells are closed at their tops and are separated one from the other by having the side partitions extend up to the cover 21. Preferably, however, underdrain 19 is a common underdrain for all of the filter cells and thereby provides communication between the lower portion of the filter cells through the underdrain plate 17.

Also in accordance with the present invention there is provided a centrally disposed water detention tank 22 which is supported with its bottom 23 overlying the top of the operating gallery 12 and extending upwardly from the level of the gallery and the filtration unit 13. In the illustration given, the outer wall 24 of the detention tank forms a continuation of the wall 25 around the operating gallery 12. Tank 24 is therefore supported on the base portion 10a to the wall 25, which also functions as the means for enclosing the operating gallery and serves as a common wall for the filtration cells. This is shown more clearly in FIGURE 2. It will be understood that the detention tank bottom 23 does not have to be flat, but may be conical or some other shape. Suitable reinforcing or bracing members 25 are provided beneath tank bottom 23 (FIG. 2). Preferably, the walls 24 and 25 are cylindrical, but also other shapes can be used.

In the illustration given, the lower portion of tank 22 provides a water storage or holding chamber 26. The upper portion of the tank 22 provides an aeration section designated generally by the number 27 (FIG. 2).

While the details of the aeration section 27 are not of great importance with respect to the present invention, the construction and operation of this section will now be briefly described for the sake of completeness. Suction blowers 28 are mounted on top of the aeration section and are arranged to draw air inwardly through the peripheral openings 30 at the base of the section. Near the upper portion of the aeration section, there is provided a distributor pan or tray 31 into which the raw water is introduced from the top of the central supply pipe 32. The water passes downwardly from distributor 31 through superimposed baffle means 29, which may be formed of aluminum mesh and provided with suitable support means. The purpose of such aeration treatment is to remove dissolved gases like carbon dioxide, hydrogen sulphide, and methane, while at the same time introducing air into the water for the purpose of oxidizing dissolved minerals like iron and manganese. The construction and operation of such aeration sections is more fully described in copending application Ser. No. 237,177, filed Nov. 13, 1962, and in copending application Sew No. 291,563, filed June 28, 1963, both now abandoned. After aeration, the water falls downwardly into the holding chamber 26, as indicated by the arrows in FIGURE 2. Since the aeration section as such does not form a part of the present invention, it is not believed to be necessary to further describe it herein.

Operating gallery 12 preferably has a height such that an ordinary-sized man can walk around therein while standing up. This is indicated by the outline of a worker W in FIGURE 2. Walkway means designated generally by the number 33 provides a horizontally-extending access passage 34 running from one side of the gallery 12 through the filtration unit 13 to the outer wall 15. In the illustration given, the passage 34 extends between the filter cells 14a and 14f and the adjacent walls 16a and 16g of these cells from the side walls of the passage (FIGS. 1 and 4). As shown in FIGURE 2, the concrete base portion 10a can provide the floor for passage 34. While the cover 21 can provide the ceiling for the passage, in the illustration given the ceiling is provided by a plate 35 which extends horizontally between the upper end portions of the plates 16a and 16g (FIGS. 2 and 4). Ceiling plate 35 also acts as a brace between the walls 16a and 16g.

A suitable closure is provided for the outer end of passage 34, such as the door 36 shown in FIGURE 3. For achieving the maximum advantage of the present invention, it is desirable to have the door or closure located at the outer end of passage 34, although it can be located at the inner end of the passage at the point where the passage enters the gallery 12. As much as possible, it is desirable to protect the passage 34 of the gallery 12 against the inclement weather conditions.

In accordance with the present invention, there is provided within gallery 12 valve-equipped pipe means which extend through the gallery and include control valve means located within the gallery. Preferably, these pipe means include a raw water supply pipe, such as the pipe 32 which has a lower section 32a extending through the center portion of the gallery 12, and downwardly through the base portion 10d to connect with a raw water supply pipe 27. An automatic water level control valve 38 is provided on pipe section 32a within gallery 12. As is well known in the art, the valve 38 is actuated in response to changes of water level in the chamber 26. When the water level falls, valve 38 is opened to supply more water to the aeration section 27, and when the water level in chamber 26 reaches a certain height, valve 38 closes.

Preferably, the pipe means within chamber 12 also includes a pipe extending from the bottom of the detention tank, the upper portion of each of the filter cells and control means therefor is located within the operating gallery. In the illustration given, there are provided a plurality of outlet pipes 39 which extend through the bottom 23 of the detention tank and connect with headers 40 for distribution of the aerated water to the upper portions of the filter cells through the laterals 41 which are provided with outlet openings 42, shown more clearly in FIGURE 1. Valves 42 are provided for controlling the flow from the pipes 39 into the headers 40.

Preferably there are also provided branch pipes 43 which connect to the inward extensions of the headers 40 for discharging water to waste while a cell is being backwashed. The downwardly-extending branch pipes 43 are preferably also control by valve means located within the gallery 12. In the illustration given, valves 42 are located at the junction of pipes 39, 40 and 43, and are designed to operate as three-way valves. In one setting of the valve, pipe 39 will communicate with header 40, while in another setting of the valve header 40 will communicate with pipe 43. Valves 42 may be operated manually or by pneumatic operating means.

Pipes 43 are arranged to discharge into the annular sump 11, which may be covered by a grill or screen 44. The waste or backwash water is removed from sump 11 by a suitable pipe 45, as indicated in FIGURE 2.

Preferably, the pipes 39, the valves 42, and the pipes 43 are arranged around the periphery of gallery 12, thereby leaving the center of the gallery open for the movements of the workmen and making it convenient for the workmen to service the valves while walking around inside the gallery.

*Operation*

The operation of the water filtration plant shown in the drawings will be apparent from the foregoing description. However, the operation may be summarized as follows:

Raw water is supplied through the pipe 37 to the vertically-extending pipe 32 which is controlled by the valve 38 within the gallery 12. The water enters the upper portion of the aeration section 27, and falls downwardly therein while being aerated. The water then collects in the chamber 26, where a minimum static head is maintained at all times, thereby permitting the filters to be operated by gravitational flow. The aerated water passes from the chamber 26 through the pipes 39 and the valves 42 into the headers 40, where it is distributed over the top of the filter medium by the laterals 41. After flowing downwardly through the filter medium, the filtered water will pass through the underdrain plate 17 into the underdrain 19. Since the underdrain 19 is common to all of the cells, water can be removed from the underdrain through a single water removal pipe such as the pipe 46 indicated in FIGURES 1 and 2. During normal filtration, water will be supplied to the tops of all of the filter cells, and all of the cells will supply filtered water to the underdrain 19.

When it is desired to backwash one of the cells, this can be done with filtered water from the other cells. The valve on line 46 will be closed, and one of the valves 42 will be set so that the header in the cell to be backwashed is connected with the waste discharge pipe 43. As previously indicated, this can be done conveniently by the workman entering the gallery 12 through the passage 34. Filtered water from the other cells will continue to pass to the underdrain 19 and will flow upwardly through the portion of the underdrain beneath the cell being backwashed. The flow pattern for a cell during normal operation is indicated by the arrows in FIGURE 1, while the reverse flow pattern during backwashing is indicated by the arrows applied to the same cell 14a in FIGURE 4. It will be understood that during backwashing the flow in the other cells, such as the cell 14f, will continue to be in the direction of producing filtered water. The waste water discharged from the pipe 43 will flow into the sump 11 and out through the waste discharge pipe 45. After the completion of the backwashing, the workman can reset the valve 42, and normal filtration can proceed upon the opening of the valve on the filtered water line 46.

In FIGURE 6 there is shown a modification of the apparatus of FIGURES 1-5. To facilitate reference, corresponding parts have been given the same numbers except that the numbers have been increased by 100. In the modified construction, the bottom 123 of detention tank 124 is conical, sloping downwardly and inwardly from tank wall 124 adjacent the junction with cover 121 which extends over the top of the filter cells.

A pipe 139 extends through tank bottom 123 for removal of water from the detention tank 122. Through a T-connection 141a, pipe 139 communicates with the filter cell distribution pipe 141. T-connection 141a also connects pipe 141 with sump discharge pipe 143. A valve 142b is provided between water removal pipe 139 and filter cell distribution pipe 141. Similarly, a valve 142a is provided between pipe 141 and sump discharge pipe 143. It will therefore be seen that the valves 142a and 142b, together with T-connection 141a, replace the three-way valve 42 of the embodiment of FIGURES 1-5. This construction is particularly desirable for larger sized units.

While in the foregoing specification this invention has been described in relation to a specific preferred embodiment thereof, it will be apparent to those skilled in the art that the invention is susceptible to additional embodiments and that certain of the details described herein can be varied without departing from the basic principles of the invention.

I claim:
1. In a self-housed large capacity water filtration plant, the combination comprising:
 (a) a horizontally-extending support base;
 (b) enclosure means providing an operating gallery disposed centrally with respect to said base and extending thereabove;
 (c) a filtration unit comprising a battery of filter cells arranged side-by-side above said base and disposed in perimetric configuration around the sides of said operating gallery;
 (d) a centrally-disposed water detention tank supported with its bottom overlying the top of said operating gallery and extending upwardly from the level of said gallery and said filtration unit;
 (e) walkway means providing a horizontally-extending access passage running from one side of said gallery through said filtration unit to the outer wall thereof; and
 (f) valve-equipped pipe means extending through said operating gallery and including control valve means located within said gallery.

2. The combination of claim 1 wherein said pipe means includes a raw water supply pipe and a control-valve therefor located within said operating gallery.

3. The combination of claim 1 wherein said pipe means includes a pipe extending from the bottom of said detention tank to the upper portion of each of said filter cells and control valve means therefor located within said operating gallery.

4. The combination of claim 3 wherein said pipes extending to said filter cells are provided with branch pipes for discharging water to waste while a cell is being backwashed, said branch pipes also being controlled by valve means located within said gallery.

5. The combination of claim 1 wherein a common wall serves as the inner wall of said filter cells and the outer wall of said gallery, and wherein said walkway means has side walls which are provided by the adjacent side walls of two of said cells.

6. In a self-housed large capacity water filtration plant, the combination comprising:
 (a) a horizontally-extending support base;
 (b) enclosure means providing an operating gallery disposed centrally with respect to said base and extending thereabove;
 (c) a filtration unit comprising a battery of filter cells arranged side-by-side above said base and disposed in perimetric configuration around the sides of said operating gallery;
 (d) a centrally-disposed water detention tank supported with its bottom overlying the top of said operating gallery and extending upwardly from the level of said gallery and said filtration unit;
 (e) walkway means providing a horizontally-extending access passage running from one side of said gallery through said filtration unit to the outer wall thereof; and
 (f) valve-equipped pipe means extending through said operating gallery and including control valve means located within said gallery, said pipe means including a raw water supply pipe and a control valve therefor located within said operating gallery, and a pipe extending from the bottom of said detention tank to the upper portion of each of said filter cells and control valve means therefor located within said operating gallery, said pipes extending to said filter cells being provided with branch pipes for discharging water to waste while a cell is being backwashed, said branch pipes also being controlled by valve means located within said gallery.

7. The combination of claim 6 wherein a common wall serves as the inner wall of said filter cells and the outer wall of said gallery, and wherein said walkway means has side walls which are provided by the adjacent side walls of two of said cells.

8. The combination of claim 6 wherein each of said pipes extending to said filter cells and the associated branch pipes are controlled by a three-way valve located within said gallery, and wherein a waste water collection sump is provided in the bottom of said gallery and said branch pipes are arranged to discharge into said sump.

9. In a self-housed large capacity water filtration plant, the combination comprising:
 (a) A horizontally-extending support base;
 (b) enclosure means providing an operating gallery disposed centrally with respect to said base and extending thereabove;
 (c) a filtration unit comprising a battery of filter cells arranged side-by-side above said base and disposed in perimetric configuration around the sides of said operating gallery;
 (d) a centrally-disposed water detention tank supported with its bottom overlying the top of said operating gallery and extending upwardly from the level of said gallery and said filtration unit;
 (e) walkway means providing a horizontally-extending access passage running from one side of said gallery through said filtration unit to the outer wall thereof; and
 (f) valve-equipped pipe means extending through said operating gallery and including control valve means located within said gallery, said pipe means including a pipe extending from the bottom of said detention tank to the upper portion of each of said filter cells, and control valve means therefor located within said operating gallery, said pipes extending to said filter cells being provided with branch pipes for discharging water to waste while a cell is being backwashed, said branch pipes also being controlled by valve means located within said gallery, said pipes and valves being arranged around the periphery of said gallery.

10. A self-housed large capacity water filtration plant, comprising in combination:
  (a) a horizontally-extending support base;
  (b) cylindrical enclosure means providing an operating gallery disposed centrally with respect to said base and extending thereabove;
  (c) an annular filtration unit comprising a battery of filter cells arranged side-by-side above said base and disposed around the sides of said operating gallery, the inner walls of said filter cells being provided by the wall of said operating gallery;
  (d) a centrally disposed cylindrical water detention tank supported with its bottom overlying the top of said operating gallery and extending upwardly from the level of said gallery and said filtration unit;
  (e) walkway means providing a horizontally-extending access passage running from one side of said gallery through said filtration unit to the outer wall thereof, the side walls of said walkway means being provided by the adjacent side walls of two of said filter cells; and
  (f) valve-equipped pipe means extending through said operating gallery and including control valve means located within said gallery.

11. The combination of claim 10 wherein said pipe means includes a raw water supply pipe and a control-valve therefor located within said operating gallery.

12. The combination of claim 10 wherein said pipe means includes a pipe extending from the bottom of said detention tank to the upper portion of each of said filter cells and control valve means therefor located within said operating gallery.

13. The combination of claim 12 wherein said pipes extending to said filter cells are provided with branch pipes for discharging water to waste while a cell is being backwashed, said branch pipes also being controlled by valve means located within said gallery.

No references cited.

SAMIH N. ZAHARNA, *Primary Examiner.*